United States Patent
Verosky et al.

(10) Patent No.: US 12,247,113 B2
(45) Date of Patent: Mar. 11, 2025

(54) HIGH STRENGTH, SILANE-MODIFIED POLYMER ADHESIVE COMPOSITION

(71) Applicant: Henkel AG & Co. KGaA, Duesseldorf (DE)

(72) Inventors: Christopher Verosky, Coventry, CT (US); Matthias Kohl, Heidelberg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 674 days.

(21) Appl. No.: 17/321,599

(22) Filed: May 17, 2021

(65) Prior Publication Data

US 2021/0269685 A1 Sep. 2, 2021

Related U.S. Application Data

(63) Continuation of application No. PCT/US2019/065390, filed on Dec. 10, 2019.

(60) Provisional application No. 62/779,083, filed on Dec. 13, 2018.

(51) Int. Cl.
| | | |
|---|---|---|
| *C08K 3/22* | (2006.01) | |
| *C08K 5/544* | (2006.01) | |
| *C09J 151/00* | (2006.01) | |
| *C08K 3/36* | (2006.01) | |
| *C08K 9/06* | (2006.01) | |

(52) U.S. Cl.
CPC ............... *C08K 3/22* (2013.01); *C08K 5/544* (2013.01); *C09J 151/003* (2013.01); *C08K 3/36* (2013.01); *C08K 9/06* (2013.01)

(58) Field of Classification Search
CPC . C08K 3/22; C08K 5/544; C08K 3/36; C08K 9/06; C08K 2003/2241; C08K 3/34; C08K 3/013; C09J 151/003; C09J 11/00; C09J 183/06; C08G 65/336; C08L 71/02
USPC ........................................................ 524/492
See application file for complete search history.

(56) References Cited

U.S. PATENT DOCUMENTS

| | | | |
|---|---|---|---|
| 4,469,522 A * | 9/1984 | Matsumoto ........... | C09C 1/3081 523/213 |
| 6,872,770 B2 | 3/2005 | Shah | |
| 10,150,895 B2 | 12/2018 | Itano et al. | |
| 2002/0146573 A1 | 10/2002 | Shimada et al. | |
| 2005/0014894 A1* | 1/2005 | Flannigan ............... | C08L 83/04 524/860 |
| 2005/0211580 A1* | 9/2005 | Kaszubski ............... | C08J 5/124 156/64 |
| 2008/0284106 A1* | 11/2008 | Maton ..................... | C08G 77/14 524/588 |
| 2011/0178220 A1* | 7/2011 | Davio ..................... | C08L 83/04 524/588 |
| 2013/0303676 A1 | 11/2013 | Otashiro et al. | |
| 2015/0159051 A1* | 6/2015 | Kohl ....................... | C08L 83/04 524/837 |
| 2016/0046793 A1* | 2/2016 | Phanopoulos ......... | C08K 5/549 524/398 |
| 2017/0306096 A1 | 10/2017 | Muthusamy et al. | |

FOREIGN PATENT DOCUMENTS

| | | |
|---|---|---|
| EP | 0572927 A1 | 12/1993 |
| JP | 2003193022 A | 7/2003 |
| JP | 2008280435 A | 11/2008 |
| JP | 2010261010 A | 11/2010 |
| JP | 2011063669 A | 3/2011 |
| JP | 2012167210 A | 9/2012 |
| JP | 2014234396 A | 12/2014 |
| WO | 2009047580 A1 | 4/2009 |
| WO | 2011110384 A1 | 9/2011 |
| WO | 2013090127 A1 | 6/2013 |
| WO | 2015111577 A1 | 7/2015 |
| WO | 2017007560 A1 | 1/2017 |
| WO | 2017216045 A1 | 12/2017 |

OTHER PUBLICATIONS

International Search Report for International PCT Patent Application No. PCT/US2019/065390 dated Apr. 8, 2020.
Michel J. Owen, "Coupling agents: chemical bonding at interfaces", in Adhesion Science and Engineering-2, Surfaces, 4 Chemistry and Applications, M. Chaudhury and A. V. Pocius eds., Elsevier, New York, 2002, p. 403.

* cited by examiner

*Primary Examiner* — Hannah J Pak
(74) *Attorney, Agent, or Firm* — Mary K. Cameron

(57) ABSTRACT

Disclosed is a moisture curable adhesive composition comprising at least one silane-modified polymer, a filler comprising a surface modified fumed silica and one of a surface modified cristobalite and a silica; and optionally, at least one of an aminosilane adhesion promotor, an organotin catalyst, a dehydration shelf life enhancer, a light stabilizer, titanium dioxide, a rheology modifier, and mixtures thereof. The adhesive composition finds special use in bonding metal substrates to each other with significantly higher bond strength than that provided by silane-modified polymer adhesives alone.

20 Claims, No Drawings

HIGH STRENGTH, SILANE-MODIFIED POLYMER ADHESIVE COMPOSITION

FIELD OF THE DISCLOSURE

This present disclosure relates generally to moisture curable adhesives, and more particularly, to a high strength moisture curable adhesive comprising a combination of silane-modified polymers and a combination of fillers.

BACKGROUND OF THE DISCLOSURE

This section provides background information which is not necessarily prior art to the inventive concepts associated with the present disclosure.

One-component, moisture-curing adhesives and sealants have for years played an important part in numerous technical applications. As well as the polyurethane adhesives and sealants with free isocyanate groups and the traditional silicone adhesives and sealants based on dimethylpolysiloxanes, there has recently also been increasing use of so-called silane-terminated adhesives and sealants. Compared with polyurethane adhesives and sealants, the silane-terminated adhesives and sealants have the advantage that they are free from isocyanate groups, in particular from monomeric diisocyanates. Furthermore, they are distinguished by a broad range of adhesion to a wide variety of substrates without any surface pretreatment using primers.

Polymer systems having reactive silyl groups are therefore known in principle. In the presence of atmospheric moisture, polymers having silyl groups with hydrolyzable substituents are already capable of condensing with one another at room temperature, splitting off the hydrolyzed residues. Depending on the concentration of silyl groups having hydrolyzable substituents and the structure of these silyl groups, mainly long-chain polymers (thermoplastics), relatively wide-mesh, three-dimensional networks (elastomers) or highly crosslinked systems (thermosets) are formed during this process. The polymers generally comprise an organic backbone which carries, for example, alkoxysilyl or acyloxysilyl groups at the ends. The organic backbone can be, for example, polyurethanes, polyesters, polyethers, etc.

These moisture curable adhesives find use as bonding agents for many applications including to bond plastic, textiles, glass, wood, and light metal bonds. One area where these current adhesives are not adequate is in the bonding of metal to metal substrates requiring high strength bonds. In current practice these bonds are accomplished using rivets or by welding. Conventional adhesives, even with the addition of silane-modified polymers, do not form bonds that are strong enough to replace rivets or welds.

It is desirable to provide a high strength polymeric adhesive that can be used to supplement or replace more traditional high strength bonds such as rivets and metal welds to secure metal substrates to each other. If such an adhesive were developed it would provide for more aesthetically pleasing bonds, reduce the size and weight of the bond and would permit for enhanced surface treatments and graphics not available with these traditional bonds. In some applications a combination of high bond strength and high elongation would be desirable.

SUMMARY OF THE DISCLOSURE

This section provides a general summary of the present disclosure and is not intended to be interpreted as a comprehensive disclosure of its full scope or all features, aspects and objectives.

One aspect of the present disclosure is to provide a high strength, moisture curable adhesive composition comprising at least one silane-modified polymer, a surface modified fumed silica filler and a surface modified cristobalite filler and optionally, at least one additive selected from adhesion promotor, catalyst, moisture scavenger, light stabilizer, rheology modifier, colorant, other filler and mixtures thereof. In some variations this moisture curable adhesive composition cures to provide 6 mPa or higher tensile strength and 4 MPa or more lap shear strength.

One aspect of the present disclosure is to provide a high strength moisture curable adhesive composition comprising at least one silane-modified polymer, a surface modified fumed silica filler, a surface modified cristobalite filler and optionally, at least one additive selected from adhesion promotor, catalyst, moisture scavenger, light stabilizer, rheology modifier, colorant, other filler and mixtures thereof. In some variations this moisture curable adhesive composition cures to provide 6 MPa or higher tensile strength and 4 MPa or more lap shear strength as well as an elongation of at least 150%.

One aspect of the present disclosure is to provide a high strength moisture curable adhesive composition comprising at least one silane-modified poly(meth)acrylate polymer, at least a second silane modified polymer, a surface modified fumed silica filler, a surface modified cristobalite filler; and optionally, at least one additive selected from adhesion promotor, catalyst, moisture scavenger, light stabilizer, rheology modifier, colorant, other filler and mixtures thereof.

These and other features and advantages of this disclosure will become more apparent to those skilled in the art from the detailed description herein. The drawings that accompany the detailed description are described below.

BRIEF DESCRIPTION OF THE DRAWINGS

None.

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

An "alkyl group" or an "alkenyl group" has the broadest meaning in the art and can be linear, branched, cyclic or a combination thereof having the specified number of carbon atoms and it may be substituted or unsubstituted.

An "alkylene group" refers to a divalent group that contains from 1 to 20 carbon atoms, that is a radical of an alkane and includes linear and branched organic groups, which groups may be substituted or substituted. Preferred alkylene groups include unsubstituted alkylene groups containing from 1-12 carbon atoms (C1-C12 alkylene)—for example unsubstituted alkylene groups containing from 1 to 6 carbon atoms (C1-C6 alkylene) or from 1 to 4 carbons atoms (C1-C4 alkylene).

An "aliphatic group" means a hydrocarbon moiety having the specified number of carbon atoms and it can be linear, branched, cyclic or a combination thereof, it can be fully saturated or contain unsaturation so long as it is not aromatic.

An "aryl group" refers to an aromatic group having the specified number of carbon atoms.

An "aralkyl group" refers to an alkyl group substituted with an aryl group with the specified number of carbon atoms and it can be substituted.

A (meth)acrylate is intended to encompass both acrylate and methacrylate monomers and combinations thereof. Therefore a (meth)acrylate polymer can be formed from methacrylate monomers, acrylate monomers or mixtures thereof "Acrylate" refers to the univalent —O—C(O)—C═C moiety.

"Substituent" groups include, for example, one or more of halogen, nitro, cyano, amido, amino, sulfonyl, sulfinyl, sulfanyl, sulfoxy, urea, thiourea, sulfamoyl, sulfamide and hydroxy.

The following abbreviations are used: g for gram, ml for milliliter, L for liter, mm for millimeter, sec for seconds, RPM for revolutions per minute, ° C. for degrees Celsius, R.H. for relative humidity.

Molecular weight refers to number average molecular weight unless otherwise specified. The number average molecular weight $M_n$, as well as the weight average molecular weight $M_w$, is determined according to the present invention by gel permeation chromatography (GPC, also known as SEC) at 23° C. using a styrene standard. This method is known to one skilled in the art.

Percentages given herein in relation to the compositions relate to weight % relative to the total weight of the respective composition unless otherwise specified.

The term "about", as used herein in connection with a numerical value, relates to a variance of ±20%, preferably ±10% of the respective value.

The term "curable" is to be understood to mean that, under the influence of external conditions, in particular under the influence of moisture present in the environment and/or supplied for the purpose, the composition can pass from a relatively flexible state, optionally possessing plastic ductility, to an irreversibly harder state. In general, the crosslinking can take place by means of chemical and/or physical influences, i.e. the already mentioned moisture present in the air or on a component to be bonded.

The present disclosure provides a high strength, moisture curable adhesive for bonding substrates, for example metal substrates, to each other. Unless otherwise specified a high strength adhesive provides 6 MPa or higher tensile strength and 4 MPa or more lap shear strength. In some embodiments the high strength, moisture curable adhesive also provides an elongation of at least 150%. Any metal substrates can be bonded with the present high strength, adhesive formulation, whether bare or pre-coated, including aluminums, steels, stainless steels, tin, galvanized metals, alloys and combinations of these metals. The adhesive forms a high strength bond between a variety of metal substrates and meets the need for an adhesive to replace rivets and welds in these environments. Use of this high strength, adhesive is simpler and more cost effective than mechanical fastening or fusion (welding). The high strength, adhesive bond allows for surface treatments such as graphics that are more aesthetically appealing compared to the prior art.

The high strength, moisture curable adhesive comprises at least one silane modified polymer. As used herein a silane modified polymer is a polymer having at least two terminal group of the general formula (I)

These alkoxy and acyloxy hydrolysable groups are capable of reacting with atmospheric moisture to form cross linking siloxane bonds between the polymers, thereby forming a high strength network.

The divalent or trivalent bonding group A comprising at least one heteroatom is understood to be a divalent or trivalent chemical group which links the polymer backbone of the silane-terminated polymer with the residue R of the formula (I). For example, the divalent or trivalent linking group A can be formed for example during the production of the alkoxysilane- and/or acyloxysilane-terminated polymer, for example as an amide or urethane group by the reaction of a polyether which is functionalized with hydroxy groups with an isocyanatosilane. The linking group can be either capable or incapable of being differentiated from structural features occurring in the underlying polymer backbone. The latter is the case, for example, if it is identical with the linking points of the repeating units of the polymer backbone.

The integer "n" corresponds to 0 (zero) or 1, i.e. the divalent or trivalent linking group A links the polymer backbone with the residue R (n=1) or the polymer backbone is bound or linked directly with the residue R (n=0).

The divalent or trivalent linking group A in the general formula (I) is preferably an oxygen atom or an

group, where R" is selected from the group consisting of a hydrogen atom and alkyl or aryl residues having 1 to 12 carbon atoms, or is a substituted or unsubstituted amide, carbamate, urethane, urea, imino, carboxylate, carbamoyl, amidino, carbonate, sulfonate or sulfinate group. Particularly preferred as linking group A are urethane and urea groups, which can be obtained by reacting certain functional groups of a prepolymer with an organosilane which carries a further functional group. Urethane groups can be formed, for example, either when the polymer backbone comprises terminal hydroxy groups and isocyanatosilanes are used as a further component, or conversely when a polymer having terminal isocyanate groups is reacted with an alkoxysilane comprising terminal hydroxy groups. Similarly, urea groups can be obtained if a terminal primary or secondary amino group—either on the silane or on the polymer—is used, which reacts with a terminal isocyanate group that is present in the respective reactant. This means that either an aminosilane is reacted with a polymer having terminal isocyanate groups or a polymer that is terminally substituted with an amino group is reacted with an isocyanatosilane.

Urethane and urea groups advantageously increase the strength of the polymer chains and of the cured adhesive.

The residue R is a divalent hydrocarbon residue having 1 to 12 carbon atoms. The hydrocarbon residue can be a linear, branched or cyclic alkylene residue. The hydrocarbon residue can be saturated or unsaturated. R is preferably a divalent hydrocarbon residue having 1 to 6 carbon atoms. The curing rate of the composition can be influenced by the length of the hydrocarbon residues which form one of the binding links or the binding link between polymer backbone and silyl residue. Particularly preferably, R is a methylene, ethylene or n-propylene group, in particular a methylene or n-propylene residue. Alkoxysilane-terminated compounds having a methylene R group as binding link to the polymer backbone—so-called "alpha-silanes"—have a particularly high reactivity of the terminating silyl group, leading to reduced setting times and thus to very rapid curing of formulations based on these polymers. In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired.

The substituents X, Y and Z in the general formula (I) are, independently of one another, selected from the group consisting of $C_1$ to $C_8$ alkyl, $C_1$ to $C_8$ alkoxy, $C_1$ to $C_8$ acyloxy groups and —$CH_2$—N—R' wherein N is oxygen or nitrogen, preferably oxygen, and R' is selected from $C_1$ to $C_8$ alkyl groups, preferably a methyl group, wherein at least one of the substituents X, Y, Z here must be a hydrolyzable group, preferably a $C_1$ to $C_8$ alkoxy or a $C_1$ to $C_8$ acyloxy group, wherein the substituents X, Y and Z are directly bound with the Si atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. These compositions are therefore suitable in particular for the DIY sector. However, acyloxy groups, such as an acetoxy group —O—CO—$CH_3$, can also be used as hydrolyzable groups.

The silane modified polymer has at least two terminal groups of the general formula (I). Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

In preferred embodiments, in the general formula (I), X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups. They are therefore suitable in particular for use as sealants. In addition, they split off even less alcohol during curing and are therefore of particular interest when the quantity of alcohol released is to be reduced. With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

The substituents X, Y and Z in the general formula (I) can each independently of one another, be selected from a methyl, an ethyl, a methoxy or an ethoxy group, or alkoxymethyl group, preferably methoxymethyl group, at least one of the substituents being a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable, such as for example in adhesives with which high initial adhesion is required.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use. In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

The polymer having the at least one terminal group of the general formula (I) is preferably a polyether, a poly(meth) acrylic acid ester, or a polyurethane.

The polymer having at least one terminal group of the general formula (I) is preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, in contrast to, e.g., polyesters, for example. One example of a silane-modified polyether polymer is Kaneka SAX 520 which is described as a trimethoxysilane terminated polyether backbone polymer A "polyether" is understood to be a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers.

The number average molecular weight $M_n$ of the polyether on which the polymer is based is for preference 2000 to 100,000 g/mol (daltons), particularly preferably at least 6000 g/mol and in particular at least 8000 g/mol. Number average molecular weights of at least 2000 g/mol are advantageous for the polyethers of the present invention, because compositions according to the invention based on polyethers with such a minimum molecular weight have significant film-forming properties. For example, the number average molecular weight $M_n$ of the polyether is 4000 to 100,000, preferably 8000 to 50,000, particularly preferably 10,000 to 30,000 and in particular 10,000 to 25,000 g/mol.

These molecular weights are particularly advantageous, since the corresponding compositions have a balanced ratio of viscosity (ease of processing), strength and elasticity.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a special embodiment of the present invention, the maximum polydispersity $M_w/M_n$ of the polyether on which the polymer is based is therefore 3, preferably 1.7, more particularly 1.5 and most preferably less than 1.3. The polydispersity is derived from the average molecular weights $M_w$ and $M_n$. It is calculated as $PD=M_w/M_n$. The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity.

A "poly(meth)acrylic acid ester" is understood to be a polymer based on (meth)acrylic acid esters, which has as a repeating unit the structure $-CH_2-CR^a(COOR^b)-$, where $R^a$ denotes a hydrogen atom (acrylic acid ester) or a methyl group (methacrylic acid ester) and $R^b$ denotes linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

A "polyurethane" is understood to be a polymer which has at least two urethane groups $-NH-CO-O-$ in the main chain. Polyurethane polymers are typically obtainable by reacting at least a polyol or a mixture of two or more polyols and a polyisocyanate or a mixture of two or more polyisocyanates to obtain a polyurethane prepolymer followed by endcapping the prepolymer with a silane group containing component. Polymer 2 described in International (PCT) patent application publication WO2017216045 describes preparation of one silane modified polyurethane polymer. Other silane modified polyurethane polymers include those available from Wacker Chemie AG under the Geniosil® name, from Momentive Performance Materials under the SPUR® name and from Evonik under the ST 81 name.

In some embodiments the high strength, moisture curable adhesive comprises a combination of at least two silane modified polymers. For example, one silane modified polymer can be a silane modified poly(meth)acrylate polymer and the other silane modified polymers will be different from the first polymer and can be selected from silane modified polyether polymer, silane modified poly(meth)acrylate polymer and silane modified polyurethane polymer.

The number average molecular weight $M_n$ of the silane modified polymer can be about 10,000 g/mol to about 100,000 g/mol, for example about 10,000 g/mol to about 50,000 g/mol and more typically about 10,000 g/mol to about 25,000 g/mol. Silane modified polymers having a molecular weight of about 10,000 g/mol to about 25,000 g/mol can be advantageous for providing an adhesive composition with a viscosity suitable for ease of application.

A "polyol" is understood to be a compound which contains at least two OH groups, irrespective of whether the compound contains other functional groups. However, a polyol used in accordance with the present invention preferably contains only OH groups as functional groups or, if other functional groups are present, none of these other functional groups is reactive at least to isocyanates under the conditions prevailing during the reaction of the polyol(s) and polyisocyanate(s).

The polyols used when producing the prepolymer may be all polyols that are usually used for polyurethane synthesis, for example polyester polyols, polyether polyols, polyester ether polyols, polycarbonate polyols or mixtures of two or more thereof.

Polyether polyols may be produced from a plurality of alcohols, which contain one or more primary or secondary alcohol groups. As an initiator for the production of polyethers that do not contain any tertiary amino groups, the following compounds or mixtures of said compounds can be used by way of example: water, ethylene glycol, propylene glycol, glycerol, butanediol, butanetriol, trimethylolethane, pentaerythritol, hexanediol, 3-hydroxyphenol, hexenetriol, trimethylolpropane, octanediol, neopentyl glycol, 1,4-hydroxymethyl cyclohexane, bis(4-hydroxyphenyl)dimethylmethanes and sorbitol. Ethylene glycol, propylene glycol, glycerol and trimethylolpropane are preferably used, particularly preferably ethylene glycol and propylene glycol, and, in a particularly preferred embodiment, propylene glycol is used.

As cyclic ethers for producing the above-described polyethers, alkylene oxides such as ethylene oxide, propylene oxide, butylene oxide, epichlorohydrin, styrene oxide or tetrahydrofuran or mixtures of these alkylene oxides may be used. Propylene oxide, ethylene oxide or tetrahydrofuran or mixtures thereof are preferably used. Propylene oxide or ethylene oxide or mixtures thereof are preferably used. Propylene oxide is most particularly preferably used.

Polyester polyols can be produced for example by reacting low molecular weight alcohols, in particular ethylene glycol, diethylene glycol, neopentyl glycol, hexanediol, butanediol, propylene glycol, glycerol, or trimethylolpropane with caprolactone. 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as polyfunctional alcohols for producing polyester polyols.

Further suitable polyester polyols may be produced by polycondensation. Difunctional and/or trifunctional alcohols having an insufficient amount of dicarboxylic acids or tricarboxylic acids or mixtures of dicarboxylic acids or tricarboxylic acids, or reactive derivatives thereof, may thus be condensed to form polyester polyols. Suitable dicarboxylic acids are, for example, adipic acid or succinic acid or dodecanedioic acid and higher homologs thereof having up to 16 carbon atoms, also unsaturated dicarboxylic acids such as maleic acid or fumaric acid and aromatic dicarboxylic acids, in particular isomeric phthalic acids, such as phthalic acid, isophthalic acid or terephthalic acid. Suitable tricarboxylic acids are for example citric acid or trimellitic acid. The aforementioned acids can be used individually or as mixtures of two or more thereof. Particularly suitable alcohols are hexane diol, butane diol, ethylene glycol, diethylene glycol, neopentyl glycol, 3-hydroxy-2,2-dimethylpropyl-3-hydroxy-2,2-dimethylpropanoate or trimethylolpropane or mixtures of two or more thereof. Polyester polyols having a high molecular weight include for example the reaction products of polyfunctional, preferably difunctional, alcohols (optionally together with small amounts of trifunctional alcohols) and polyfunctional, preferably difunctional carboxylic acids. Instead of free polycarboxylic acids, the corresponding polycarboxylic acid anhydrides or corresponding polycarboxylic acid esters can also be used (where possible) with alcohols having preferably 1 to 3 carbon atoms. The polycarboxylic acids can be aliphatic, cycloaliphatic, aromatic or heterocyclic, or both. They can optionally be substituted, for example by alkyl groups, alkenyl groups, ether groups or halogens. Suitable polycarboxylic acids are, for example, succinic acid, adipic acid, suberic acid, azelaic acid, sebacic acid, dodecanedioic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimer fatty acid or trimer fatty acid, or mixtures of two or more thereof.

Polyesters that can be obtained from lactones, for example based on epsilon-caprolactone, also referred to as "polycaprolactone", or hydroxycarboxylic acids, for example omega-hydroxy caproic acid, can also be used.

Polyester polyols of oleochemical origin can also be used. Polyester polyols of this kind can be produced, for example, by complete ring opening of epoxidized triglycerides of a fat mixture that contains an at least partially olefinically unsaturated fatty acid and has one or more alcohols having 1 to 12 carbon atoms and subsequent partial transesterification of the triglyceride derivatives to form alkyl ester polyols having 1 to 12 carbon atoms in the alkyl group.

Polycarbonate polyols can be obtained, for example, by reacting diols such as propylene glycol, butanediol-1,4 or hexanediol-1,6, diethylene glycol, triethylene glycol or tetraethylene glycol or mixtures of said diols with diaryl carbonates, for example diphenyl carbonates, or phosgene.

The molecular weight of the polyols used for synthesizing the prepolymer is preferably in the range of from 200 to 30,000 g/mol, in particular 400 to 18,000 g/mol. The average hydroxyl functionality can be in the range of from 2 to 4.5.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

A "polyisocyanate" is understood to be a compound which has at least two isocyanate groups —NCO. This compound does not have to be a polymer, and instead is frequently a low molecular compound such as a polyisocyanate monomer.

The polyisocyanates suitable for preparing the polyurethane according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

The high strength, moisture curable adhesive comprises a specific combination of a surface modified fumed silica in combination with a second filler selected from surface modified quartz, modified cristobalite and combinations thereof.

The surface modified fumed silica is preferably modified by coating silica with silane groups, for example with alkylsilyl groups and in particular with trimethylsilyl groups. Some exemplary surface modified fumed silica materials include Aerosil® R silicas such as R972, R812, R974, R7200 and R8200, available from Evonik; the H silicas such as HDK-2000, HDK H-20 and HDK 30RY available from Wacker Chemie AG; and the Cab-O-Sil silicas available from Cabot.

Quartz is a form of silica, having the same chemical formula, $SiO_2$, as common silica but a distinctly different crystalline structure. Quartz is a naturally occurring mineral which can be physically processed into a powder with particle sizes ranging from 0.1 μm to 100. Preferably the quartz is surface modified with silane groups or epoxy groups. Some useful surface modified quartz fillers are SILBOND surface treated silica flour available from HPF Minerals.

Cristobalite is a high temperature polymorph of silica, having the same chemical formula, $SiO_2$, as common silica but a distinctly different crystalline structure. Cristobalite can be synthesized from quartz using thermal processes. Cristobalite is available as a powder with particle sizes ranging from 128 μm to 2 μm. Preferably the cristobalite is also surface modified with silane groups such as methacrylsilane, trimethylsilane, methylsilane groups or epoxysilane groups. Some useful surface modified cristobalite fillers are the Silbond® EST, MST RST and TST materials available from Quarzwerke DE.

The combination of two different silane modified polymers in combination with surface modified fumed silica and at least one of surface modified cristobalite or surface modified quartz produces a high strength adhesive having the desired 6 mPa or higher tensile strength and 4 MPa or more lap shear strength.

The disclosed adhesive can be formulated as a one component or as a two component system as desired. The two component system is especially useful for enclosed bond lines where it is difficult for atmospheric moisture to react with a one-part adhesive.

The high strength, moisture curable adhesive can optionally comprise one or more additives selected from plasticizer, diluent, adhesion promotor, catalyst, moisture scavenger, UV/light stabilizer, antioxidant, rheology modifier, colorant, filler and combinations thereof.

The high strength, moisture curable adhesive can optionally comprise one or more plasticizers to adjust the elastic properties and to improve the processability of the composition. A plasticizer is understood to be a substance which reduces the viscosity of the composition and thus makes processing easier, and in addition improves flexibility and extensibility of the compositions.

The plasticizer is preferably selected from a fatty acid ester, a dicarboxylic acid ester (except cyclohexanedicarboxylic acid dialkyl ester), an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer and a chlorinated paraffin, and mixtures of two or more thereof. By the careful selection of one of these plasticizers or of a specific combination, further advantageous properties of the composition according to the invention, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Dusseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, Düsseldorf). Likewise, suitable as plasticizers within the framework of the present invention are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully.

In principle, phthalic acid esters can also be used as plasticizers, but because of their toxicological potential these are not preferred.

The total quantity of plasticizer(s) in curable compositions according to the invention is for preference 0 to 30 wt. %, preferably 0 to 15 wt. % and particularly preferably 0 to 5 wt. %, based in each case on the total weight of the curable composition.

The high strength, moisture curable adhesive can optionally comprise one or more diluents, either reactive or non-reactive. The reactive diluent preferably has at least one functional group which reacts with e.g. moisture or atmospheric oxygen after application. Examples of these groups are silyl groups, isocyanate groups, vinylically unsaturated groups and polyunsaturated systems. As reactive diluent, it is possible to use any compounds which are miscible with the composition according to the invention with a reduction of the viscosity and have at least one group that is reactive with the binder, individually or as a combination of several compounds. The viscosity of the reactive diluent is preferably less than 20,000 mPas, particularly preferably about 0.1-6000 mPas, most particularly preferably 1-1000 mPas (Brookfield RVT, 23° C., spindle 7, 10 rpm).

As reactive diluents it is possible to use, for example, polyalkylene glycols reacted with isocyanatosilanes (for example Synalox 100-50B, DOW), alkyltrimethoxysilane, alkyltriethoxysilane, such as methyltrimethoxysilane, methyltriethoxysilane and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyl-triethoxysilane (GF56, Wacker), vinyltriacetoxysilane (GF62, Wacker), isooctyltrimethoxysilane (TO Trimethoxy), isooctyltriethoxysilane (TO Triethoxy, Wacker), N-trimethoxysilylmethyl-O-methylcarbamate (XL63, Wacker), N-dimethoxy(methyl)silylmethyl-O-methylcarbamate (XL65, Wacker), hexadecyltrimethoxysilane, 3-octanoylthio-1-propyltriethoxysilane and partial hydrolyzates of these compounds. Furthermore, the following polymers from Kaneka Corp. can also be used as reactive diluents: MS 5203H, MS 5303H, MS SAT 010 and MS SAX 350. Also, suitable as reactive diluents are polymers which can be produced from an organic backbone by grafting with a vinylsilane or by reaction of polyol, polyisocyanate and alkoxysilane.

Suitable as polyols for producing a reactive diluent are e.g., aliphatic alcohols include, for example, ethylene glycol, propylene glycol and higher glycols, as well as other polyfunctional alcohols. The polyols can additionally comprise other functional groups, such as e.g. esters, carbonates, amides. To produce a reactive diluent by reaction of polyol with polyisocyanate and alkoxysilane, the corresponding polyol component is reacted in each case with an at least difunctional isocyanate. Suitable as the at least difunctional isocyanate is in principle any isocyanate having at least two isocyanate groups, but within the framework of the present invention, compounds having two to four isocyanate groups, in particular two isocyanate groups, are generally preferred. Among the alkoxysilyl groups, the di- and trialkoxysilyl groups are preferred.

The polyisocyanates described above for producing polyurethanes are also suitable as polyisocyanates for producing a reactive diluent.

The diluent can also be a solvent. Suitable as solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used since in this case the storage stability increases. $C_1$-$C_{10}$ alcohols are particularly preferred, particularly methanol, ethanol, i-propanol, isoamyl alcohol and hexanol.

The high strength, moisture curable adhesive can optionally comprise an adhesion promoter. Exemplary adhesion promoters are described in: Michel J. Owen, "Coupling agents: chemical bonding at interfaces", in Adhesion Science and Engineering-2, Surfaces, Chemistry and Applications, M. Chaudhury and A. V. Pocius eds., Elsevier, New York, 2002, p. 403, incorporated by reference herein. Preferred adhesion promoters include organo-silanes which can link the silane-functional polymer to the surface such as amino silanes and epoxy silanes. Some exemplary aminosilane adhesion promoters include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or gamma.-ureidopropyltrialkoxysilane. Particularly preferred amino silanes include 3-aminopropyltrimethoxysilane, 3-aminopropyltriethoxysilane. Some exemplary epoxy silane adhesion promoters include 3-glycidyloxypropyltrimethoxysilane, 3-glycidyloxypropyltriethoxysilane or beta-(3,4-epoxycyclohexyl) ethyltrimethoxysilane. Other silane adhesion promoters include mercaptosilanes. Some exemplary mercaptosilane adhesion promoters include 3-mercaptopropyltrimethoxysilane, 3-mercaptopropylmethyldimethoxysilane or 3-mercaptopropyltriethoxysilane. The level of adhesion promoter employed can be from 0 to 4%, preferably 1 to 4% and more preferably 2 to 3% by weight based on the total weight of the high strength, moisture curable adhesive.

The high strength, moisture curable adhesive can optionally comprise a catalyst. Exemplary catalysts include bismuth compounds such as bismuth carboxylate; organic tin catalysts such as dimethyltin dineodecanoate, dibutyltin oxide and dibutyltin diacetate; titanium alkoxides (TYZOR® types, available from DuPont); tertiary amines such as bis (2-morpholinoethyl) ether, 2,2'-Dimorpholino Diethyl Ether (DMDEE) and triethylene diamine; zirconium complexes (KAT XC6212, K-KAT XC-A209 available from King Industries, Inc.); aluminum chelates (K-KAT 5218, K-KAT 4205 available from King Industries, Inc.), KR types (available from Kenrich Petrochemical, Inc.); and other organometallic compounds based on Zn, Co, Ni, and Fe and the like. The level of catalyst employed will depend on the type of catalyst used but can range from about 0 to about 2% by weight, advantageously from about 0.05 to about 0.5% and more advantageously from about 0.2 to about 0.35%, based on the total weight of the high strength, moisture curable adhesive.

The high strength, moisture curable adhesive can optionally comprise a moisture scavenger. Exemplary moisture scavengers include vinylsilanes such as 3-vinylpropyltriethoxysilane, oxime silanes such as methyl-0,0',0''-butan-2-one trioximosilane or O,O',O'',O'''-butan-2-one tetraoximosilane (CAS no. 022984-54-9 and 034206-40-1); benzamidosilanes such as bis(N-methylbenzamido)methylethoxysilane (CAS no. 16230-35-6); carbamatosilanes such as carbamatomethyltrimethoxysilane; aminosilanes such as (3-aminopropyl)trimethoxysilane and combinations thereof. The use of methyl-, ethyl- or vinyltrimethoxysilane, tetramethyl- or tetraethylethoxysilane is also possible. The level of moisture scavenger employed can be from 0 to 5% by weight, preferably from about 1 to 5%, and more preferably about 1.5 to 2.5% based on the total weight of the high strength, moisture curable adhesive.

The high strength, moisture curable adhesive can optionally comprise a light stabilizer. Exemplary light stabilizers include hindered amine light stabilizers (HALS) such as such as Tinuvin® 770 DF available from BASF, benzotriazoles such as Tinuvin® 328 available from BASF, benzophenones, benzoates, cyanoacrylates, acrylates, sterically hindered phenols, phosphorus and/or sulfur can also be added. The level of light stabilizer employed can be from 0 to 3% by weight, preferably from about 1 to 3%, and more preferably about 0.9 to 1.2% based on the total weight of the high strength, moisture curable adhesive.

The high strength, moisture curable adhesive can optionally comprise a rheology modifier. Exemplary rheology modifiers include the Thixcin® materials available from Elementis Specialties and the Disparlon® materials available from King Industries. The level of rheology modifier employed can be from 0 to 5% by weight and preferably from 0 to 2.5%, based on the total weight of the high strength, moisture curable adhesive.

The high strength, moisture curable adhesive can optionally comprise a colorant. Exemplary coloring agents include carbon black, titanium dioxide, C.I. Pigment Blue 28, C.I. Pigment Yellow 53 and phthalocyanine blue BN. The level of colorant employed can be from 0 to 5% by weight and preferably from 0 to 1%, based on the total weight of the high strength, moisture curable adhesive.

The high strength, moisture curable adhesive can optionally comprise further fillers. Exemplary further fillers include lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, clay, nanosilica, silica that have been surface treated with a silane or silazane such as the AEROSIL products available from Evonik Industries, silica that have been surface treated with an acrylate or methacrylate such as AEROSIL R7200 or R711 available from Evonik Industries, precipitated silica, untreated fumed silica, graphite, synthetic fibers and mixtures thereof. The level of filler employed can be from 0 to 10 or more %, preferably 1 to 8% and more preferably 3 to 6% by weight based on the total weight of the high strength, moisture curable adhesive.

In the Table below the components of the presently disclosed adhesive composition are presented in their preferred and most preferred ranges, note as discussed at least one silane-modified polymer is used along with the filler combination. The amounts are the percentage by weight based on the total adhesive weight.

TABLE 1

| Component | Preferred range % | Most preferred range % |
|---|---|---|
| first silane-modified polymer | 0-60 | 20-30 |
| second silane-modified polymer | 0-60 | 30-40 |
| surface modified fumed silica | 10-20 | 12-15 |
| surface modified cristobalite filler or quartz filler | 15-25 | 17-20 |
| plasticizer | 0-15 | 0-5 |
| diluent | 0-10 | 0-5 |
| adhesion promotor | 0-4 | 2-3 |
| catalyst | 0-2 | 0.20-0.35 |
| moisture scavenger | 0-5 | 1.5-2.5 |

TABLE 1-continued

| Component | Preferred range % | Most preferred range % |
|---|---|---|
| light stabilizer | 0-3 | 0.9-1.2 |
| rheology modifier | 0-5 | 0-2 |
| colorant | 0-5 | 0-1 |
| further filler | 0-10 | 3-6 |

The adhesive compositions are typically prepared by adding the polymers and fillers to a mixer under vacuum. The mixture is heated under vacuum to remove moisture. Once the mixture is homogeneously mixed and moisture removed the temperature can be lowered and catalyst and optional moisture scavenger can be added and homogeneously mixed. After mixing the final adhesive composition is disposed in a storage container.

The final composition will react with moisture in the air, in the process equipment and in containers to crosslink or cure. Processing and storage of the final adhesive composition is preferably done under anhydrous conditions such as in a dried container or under an inert gas blanket or a vacuum to lessen reaction with moisture and prolong the storage life of the adhesive.

The following examples illustrate but do not limit the disclosure.

Tensile strength and elongation were tested following ASTM D 412. Shore A hardness was tested following ASTM D 2240. Lap shear strength was tested following ASTM D 1002 with gap of 1 mm overlap ½" and test speed 0.5 inches/minute.

EXAMPLES

The examples were prepared using the following procedure. Initially all materials were dried to remove moisture. The silane modified polymers were added and mixed. Surface modified cristobalite and fillers were mixed into the polymer mixture. In a third mixing step the remaining materials with the exception of any catalyst are mixed in. Finally, catalyst, is used, is mixed in. The final mixture was loaded into a plastic cartridge.

Unless otherwise indicated the Example compositions are set out in weight % and amounts total 100%.

| Example | 1 | 2 | 3 | 4 |
|---|---|---|---|---|
| Raw Material | wt. % | wt. % | wt. % | wt. % |
| silane modified polymer[1] | 20.4 | 30.4 | 40.4 | 10.4 |
| silane modified polymer[2] | 30.0 | 20.0 | 10.0 | 40.0 |
| surface modified silica[3] | 15.0 | 15.0 | 15.0 | 15.0 |
| surface modified cristobalite[4] | 20.2 | 20.2 | 20.2 | 20.2 |
| titanium dioxide[5] | 6.0 | 6.0 | 6.0 | 6.0 |
| rheology modifier[6] | 2.0 | 2.0 | 2.0 | 2.0 |
| light stabilizer[7] | 0.04 | 0.04 | 0.04 | 0.04 |
| light stabilizer[8] | 1.2 | 1.2 | 1.2 | 1.2 |
| VTMO | 2.1 | 2.1 | 2.1 | 2.1 |
| AMMO (16-61) | 2.3 | 2.3 | 2.3 | 2.3 |
| catalyst[9] | 0.8 | 0.8 | 0.8 | 0.8 |

[1]MA 480 available from Kaneka. MA 480 is described as a silane modified polymer having a modified acrylic backbone comprising a mixture of both polyether and polyacrylate moieties.
[2]SAX 520 available from Kaneka
[3]Aerosil R8200 available from Evonik
[4]Silbond 8000 TST available from HPF Minerals
[5]RFC-5 Titanium dioxide available from Huntsman
[6]Thixin R available from Elementis Specialties
[7]Tinuvin 328 available from BASF
[8]ZP-Tinuvin solution
[9]Cat Solt ZP 20173 KAT

| Example | 5 | 6 | 7 |
|---|---|---|---|
| Raw Material | wt. % | wt. % | wt. % |
| silane modified polymer[1] | 0 | 20.4 | 0 |
| silane modified polymer[2] | 20.4 | 0 | 0 |
| silane modified polymer[3] | 30.4 | 30.4 | 30.4 |
| silane modified polymer[4] | 0 | 0 | 20.4 |
| surface modified silica[5] | 15.0 | 15.0 | 15.0 |
| surface modified cristobalite[6] | 20.2 | 20.2 | 20.2 |
| titanium dioxide[7] | 6.0 | 6.0 | 6.0 |
| rheology modifier[8] | 2.0 | 2.0 | 2.0 |
| light stabilizer[9] | 0.04 | 0.04 | 0.04 |
| light stabilizer[10] | 1.2 | 1.2 | 1.2 |
| VTMO | 2.1 | 2.1 | 2.1 |
| AMMO (16-61) | 2.3 | 2.3 | 2.3 |
| catalyst[11] | 0.4 | 0.4 | 0.4 |

[1]MA 480 available from Kaneka
[2]SAX 750 available from Kaneka
[3]SAX 520 available from Kaneka
[4]ST81 available from Evonik
[5]Aerosil R8200 available from Evonik
[6]Silbond 8000 TST available from HPF Minerals
[7]RFC-5 Titanium dioxide available from Huntsman
[8]Thixin R available from Elementis Specialties
[9]Tinuvin 328 available from BASF
[10]ZP-Tinuvin solution
[11]Cat Solt ZP 20173 KAT Comparative Example A As a control comparative adhesive, not according to the present disclosure, the commercially available adhesive, MS 939NA from Henkel, which represents the current performance of standard silane-modified polymer adhesives was used. After 7 days at 21° C. and 50% R.H. the cured comparative formulation had a tensile strength of 2.74 MPa, an elongation of 465% as per ASTM D 412 and a Shore A hardness of 48 per ASTM D 2240. After 21 days of cure at 21° C. and 50% R.H. the comparative formulation had a lap shear strength of 2.2 MPa on clear anodized aluminium and 2.78 MPa on 316 stainless steel. In the aluminium lap shear test the failure mode was 80% cohesive while in the stainless steel test the failure mode as 100% cohesive.

The data from the above examples is further presented in the below Tables. The cured properties were taken after 7 days at 21° C. and 50% R.H. while the last 4 are after 21 days of cure at 21° C. and 50% R.H.

| Test | 1 | 2 | 3 | 4 | A |
|---|---|---|---|---|---|
| specific gravity | 1.3 | 1.3 | 1.3 | 1.3 | 1.45 |
| skin over time (min) | 4 | 3 | 4 | 2 | 7 |
| Tensile strength (Mpa) | 6.5 | 7.2 | 8.0 | 6.5 | 2.7 |
| Elongation (%) | 188 | 145 | 97 | 250 | 465 |
| Shore A hardness | 65 | 72 | 73 | 61 | 48 |
| Aluminum lap shear test (Mpa) | np[1] | np | np | np | 2.2 |
| Failure mode | 100% cohesive | 100% cohesive | 100% cohesive | 100% cohesive | 80% cohesive |
| Stainless steel lap shear test (Mpa) | | | | | 2.78 |
| Failure mode | 100% cohesive | 100% cohesive | 100% cohesive | 100% cohesive | 100% cohesive |

[1]np is not performed

| Test | 5 | 6 | 7 | A |
|---|---|---|---|---|
| specific gravity | 1.29 | 1.31 | 1.29 | 1.45 |
| skin over time (min) | 3 | 2 | 3 | 7 |
| Tensile strength (Mpa) | 6.0 | 7.2 | 7.6 | 2.7 |
| Elongation (%) | 227 | 200 | 185 | 465 |
| Shore A hardness | 64 | 61 | 66 | 48 |
| Aluminum lap shear test (Mpa) | np | np | np | 2.2 |
| Failure mode | 100% cohesive | 100% cohesive | 100% cohesive | 80% cohesive |
| Stainless steel lap shear test (Mpa) | np | np | np | 2.78 |
| Failure mode | 100% cohesive | 100% cohesive | 100% cohesive | 100% cohesive |

The data shows the significant benefits of an adhesive prepared according to the present disclosure over comparative Example A. The adhesives according to the present disclosure all exhibited significantly higher tensile strength, significantly less elongation, and significantly higher Shore A hardness. The tensile strength values were over 2 to 2.9 fold greater, the elongation was less than half and the Shore A hardness was over 25% greater. The adhesive formulations according to the present disclosure provide a significant advancement in high strength adhesives.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

We claim:

1. A high strength, moisture curable adhesive composition comprising:
   a silane-modified poly(meth) acrylate polymer component;
   a first filler comprising a surface modified fumed silica;
   a second filler selected from surface modified cristobalite and surface modified quartz;
   a catalyst selected from the group consisting of bismuth compounds, organotin compounds, tertiary amines, zirconium complexes, aluminum chelates, organometallic compounds based on Zn, Co, Ni, and Fe, and combinations thereof; and
   optionally an additive selected from the group consisting of adhesion promotor, moisture scavenger, light stabilizer, further filler, rheology modifier, colorant and mixtures thereof.

2. The high strength, moisture curable adhesive composition of claim 1, wherein the silane-modified polymer component further comprises a silane modified polymer selected from the group consisting of silane-modified polyether polymer, silane-modified polyurethane polymer and mixtures thereof.

3. The high strength, moisture curable adhesive composition of claim 1, wherein the silane-modified polymer component comprises both the silane-modified poly(meth) acrylate polymer and a silane-modified polyether polymer.

4. The high strength, moisture curable adhesive composition of claim 1, wherein the silane-modified polymer component comprises both poly(meth) acrylate and polyether moieties.

5. The high strength, moisture curable adhesive composition of claim 1, wherein said at least one silane-modified polymer is present in an amount of up to 60% by weight based on the total weight of the adhesive composition.

6. The high strength, moisture curable adhesive composition of claim 1, wherein said first filler is present in an amount of from 10 to 20% by weight and said second filler is present in an amount of from 15 to 25% by weight, each based on the total weight of the adhesive composition.

7. The high strength, moisture curable adhesive composition of claim 1, wherein said composition comprises 0.05 to 0.50% by weight of an organotin catalyst based on the total weight of the adhesive composition.

8. The high strength, moisture curable adhesive composition of claim 1, wherein said composition comprises from 1 to 4% by weight of an aminosilane adhesion promotor based on the total weight of the adhesive composition.

9. The high strength, moisture curable adhesive composition of claim 1, wherein said composition comprises from 1 to 5% by weight of a moisture scavenger based on the total weight of the adhesive composition.

10. The high strength, moisture curable adhesive composition of claim 1, wherein said composition comprises from 1 to 3% by weight of a light stabilizer based on the total weight of the adhesive composition.

11. The high strength, moisture curable adhesive composition of claim 1, wherein said composition comprises from 3 to 6% by weight of titanium dioxide based on the total weight of the adhesive composition as the further filler.

12. The high strength, moisture curable adhesive composition of claim 1, wherein the composition comprises from 15% to 25% by weight of the surface modified cristobalite based on the total weight of the adhesive composition.

13. The high strength, moisture curable adhesive composition of claim 1, wherein the composition is a one component composition.

14. The high strength, moisture curable adhesive composition of claim 1, wherein the composition is a two-component curable adhesive composition, the two-component comprising:
   a first part including the silane-modified polymer component;
   a second part maintained separately from the first part, the second part including water;
   the first filler present in the first part, the second part or both;
   the second filler present in the first part, the second part or both; and
   the additive optionally present in the first part, the second part or both.

15. Cured reaction products of the high strength, moisture curable adhesive composition of claim 1.

16. An article comprising the high strength, moisture curable adhesive composition of claim 1.

17. An article comprising cured reaction products of the high strength, moisture curable adhesive composition of claim 1.

18. The high strength, moisture curable adhesive composition of claim 1, wherein the composition is free of clay.

19. A high strength, moisture curable adhesive composition comprising:
   a silane-modified poly(meth) acrylate polymer component;
   a first filler comprising a surface modified fumed silica;
   a second filler selected from surface modified cristobalite and surface modified quartz; and
   optionally an additive;
   wherein the composition is free of clay.

20. A high strength, moisture curable adhesive composition comprising:
- up to 60 wt. % of a silane-modified polymer component;
- 10 to 20 wt. % of a first filler comprising a surface modified fumed silica;
- 15 to 25 wt. % of a second filler selected from surface modified cristobalite and surface modified quartz; and
- optionally an additive;
- wherein the composition is free of clay.

* * * * *